United States Patent
Weber (10) Patent No.: US 11,647,865 B2
(45) Date of Patent: May 16, 2023

(54) CONICAL BURR HAND GRINDER

(71) Applicant: Strategic Exits LLC, Incline Village, NV (US)

(72) Inventor: Douglas Weber, Incline Village, NV (US)

(73) Assignee: Srategic Exits LLC, Incline Village, NV (US)

(*) Notice: Subject to any disclaimer, the term of this patent is extended or adjusted under 35 U.S.C. 154(b) by 165 days.

(21) Appl. No.: 17/193,124

(22) Filed: Mar. 5, 2021

(65) Prior Publication Data

US 2022/0279973 A1 Sep. 8, 2022

(51) Int. Cl.
| | |
|---|---|
| A47J 42/04 | (2006.01) |
| A47J 42/46 | (2006.01) |
| B02C 18/24 | (2006.01) |
| B02C 2/10 | (2006.01) |

(52) U.S. Cl.
CPC ............... *A47J 42/04* (2013.01); *A47J 42/46* (2013.01); *B02C 18/24* (2013.01)

(58) Field of Classification Search
CPC .. A47J 42/00; A47J 42/06; A47J 42/38; A47J 42/04; A47J 42/46; B02C 18/24; F16H 2003/0807; F16H 3/08; F16H 3/089; F16H 3/145; F16H 1/20; F16H 1/203
USPC .................................... 74/375, 377, 378, 379
See application file for complete search history.

(56) References Cited

U.S. PATENT DOCUMENTS

| | | | |
|---|---|---|---|
| D113,738 S | 5/1938 | Hand | |
| 6,377,022 B1 | 4/2002 | Rhoads | |
| 7,464,888 B2 | 12/2008 | Maylkke | |
| 7,604,191 B2 | 10/2009 | Pai | |
| D634,155 S | 3/2011 | Duncan | |
| 8,534,579 B2 | 9/2013 | Carapelli | |
| D700,006 S | 2/2014 | Braune | |

(Continued)

FOREIGN PATENT DOCUMENTS

| | | |
|---|---|---|
| AU | 2016203881 | 6/2016 |
| CN | 2624781 Y * | 7/2004 |

(Continued)

OTHER PUBLICATIONS

HG-1 Hand Grinder, retrieved date Sep. 6, 2022 https://www.home-barista.com/grinders/hg-1-hand-grinder-thoughts-on-first-month-t64828.html.*

(Continued)

*Primary Examiner* — Matthew Katcoff
*Assistant Examiner* — Mohammed S. Alawadi
(74) *Attorney, Agent, or Firm* — Todd R. Miller (57) ABSTRACT

A novel device for hand grinding coffee is disclosed. The device preferably includes a base, a stanchion disposed about the base, and a gear box, a burr collar, and a flywheel each extending away from the stanchion. The flywheel includes a handle for turning it. The device further includes a gear mechanism including a main driven shaft. The main driven shaft extends downward from the gear box. There also is a burr mechanism driven by the gear mechanism. The device may include a variable transmission mechanism having a first gear set and a second gear set selectively engageable to drive the main driven shaft. The device may also include a tumbler having a ground chamber. A distribution member is configured to rotate within the ground chamber of the tumbler during operation of the device.

19 Claims, 8 Drawing Sheets

(56) References Cited

U.S. PATENT DOCUMENTS

| | | | |
|---|---|---|---|
| 8,960,077 B2 | 2/2015 | Doglioni Major | |
| D756,700 S | 5/2016 | Warman | |
| 9,427,110 B2 | 8/2016 | Hoare | |
| 9,578,989 B2 | 2/2017 | Laegdsgaard | |
| D839,659 S | 2/2019 | Cometti | |
| 2015/0257600 A1* | 9/2015 | Krus | A47J 42/46 241/259 |
| 2016/0220068 A1* | 8/2016 | Naden | A47J 42/46 |
| 2017/0181568 A1* | 6/2017 | Wang | A47J 42/06 |
| 2018/0125300 A1* | 5/2018 | Lyn | A47J 42/26 |
| 2018/0303288 A1 | 10/2018 | Mazzer | |

FOREIGN PATENT DOCUMENTS

| | | | | | |
|---|---|---|---|---|---|
| CN | 108187844 A | * | 6/2018 | ......... | B02C 18/0092 |
| CN | 208808266 U | * | 5/2019 | | |
| CN | 212630607 U | * | 3/2021 | | |

OTHER PUBLICATIONS

Lyn WeberWorkshops HG-1 Hand Grinder; retrieved date Sep. 7, 2022. https ://www.youtube.com/watch?v=B7BsiCtyRkc.*
Manual Transmission, retrieved date ; retrieved date Sep. 7, 2022. https://www.youtube.com/watch?v=wCu9W9xNwtl.*
Manual Coffee Grinder,IMAVO, retrieved date Feb. 3, 2023. https://www.amazon.com/Manual-Grinder-IMAVO-Vintage-Grinders/.*
English translate (CN108187844A), retrieved date Feb. 3, 2023.*
English translate (CN2624781Y), retrieved date Feb. 3, 2023.*
English translate (CN208808266U), retrieved date Feb. 3, 2023.*
English translate (CN212630607U), retrieved date Feb. 3, 2023.*

* cited by examiner

CONICAL BURR HAND GRINDER

BACKGROUND

The present disclosure relates generally to a mechanism for grinding coffee beans.

SUMMARY

One exemplary embodiment of the disclosed subject matter is a grinding device including a base and a stanchion having a top end and an opposing bottom end. The bottom end of the stanchion is disposed about the base. A gear box, a burr collar, and a flywheel each extend away from the stanchion. The flywheel includes a handle for turning it. The device further includes a gear mechanism having a main driving gear, a main driving shaft, a main driven gear, and a main driven shaft. The main driven shaft extends downward from the gear box. There also is a burr mechanism including a first set of burrs and a second set of burrs. The first set of burrs is rotatably coupled to the main driven shaft. The device also preferably includes an optional variable transmission mechanism having a first gear set and a second gear set. Each set is selectively engageable to drive the gear mechanism.

The first gear set is preferably a 1:1 gear set, wherein the second gear set is preferably a 1:2 gear set. The first gear set includes a 1:1 driving gear with a first set of teeth, and a 1:1 driven gear with a second set of teeth. The second gear set includes a 1:2 driving gear with a third set of teeth, and a 1:2 driven gear with a fourth set of teeth. The device may further comprise a gear selection lever disposed about the gear box, wherein the first gear set and the second gear set are selectively engageable by rotation of the gear selection lever.

The gear selection lever may be coupled to a gear change axle having a gear change channel. The device may include a gear shuttle sleeve slideably disposed about the gear change axle, wherein the gear shuttle sleeve has a hole. A shuttle detent is configured to fit within the hole of the gear shuttle sleeve. A gear shuttle finger extends away from the gear shuttle sleeve, wherein rotation of the gear selection lever causes the shuttle detent to slide axially within the gear change channel. A gear coupler may be disposed about the main driving shaft. The gear coupler includes a coupler channel configured to receive the shuttle finger. Rotation of the gear selection lever causes the gear coupler to slide axially along the main driving shaft.

The device may further comprise a 1:1 coupling gear and a 1:2 coupler gear, each disposed about the main driving shaft. Rotation of the gear selection lever causes the gear coupler to slide axially along the main driving shaft and engage the 1:1 coupling gear or the 1:2 coupling gear.

The device may further include a tumbler having a top, an opposing bottom, and a ground chamber. A first set of magnets is disposed about the top of the tumbler. A burr mount is also supported by the burr collar, wherein a second set of magnets is disposed about the burr mount for attracting the first set of magnets of the tumbler.

The device may include a wiper supported by the burr collar. The wiper is configured to slide about the tumbler in the ground chamber during operation of the device.

The device may further include a distribution member supported by the burr collar. The distribution member is configured to rotate within the ground chamber of the tumbler during operation of the device. The distribution member is preferably a stainless steel rod.

BRIEF DESCRIPTION OF THE DRAWINGS

Some non-limiting exemplary embodiments of the disclosed subject matter are illustrated in the following drawings. Identical or duplicate or equivalent or similar structures, elements, or parts that appear in one or more drawings are generally labeled with the same reference numeral, optionally with an additional letter or letters to distinguish between similar objects or variants of objects, and may not be repeatedly labeled and/or described. Dimensions of components and features shown in the figures are chosen for convenience or clarity of presentation. For convenience or clarity, some elements or structures are not shown or shown only partially and/or with different perspective or from different point of views.

DETAILED DESCRIPTION

Coffee is a glorious ritual, vice, and hobby. In the specialty coffee industry, espresso is a common way to consume the beverage. Espresso is made by creating a fine powder, tamping/compressing that powder, and applying hot water at high pressures (usually 6-9 bar) through the compacted coffee grounds to create a thick and aromatic "shot" of espresso. Preparation of the compacted coffee grounds, commonly referred to as a "puck," can greatly influence the flavor of a shot of espresso. Variabilities in the puck density can cause channeling (when water preferentially finds a path of least resistance and squirts out instead of an even, slow flow). Such channeling adversely affects the desired extraction of the entire coffee bed, resulting in a decrease in overall shot quality and flavor. To ameliorate such variabilities in puck density, a conventional homogenization tool such as a shaker with a lid may be used to agitate the ground coffee before dosing into a portafilter for tamping.

Moreover, many coffee aficionados, and particularly espresso enthusiasts, will tell you the quality of the ground coffee that goes into making the puck is critical. Conventional coffee grinders often produce granules with varying dimensions. Some are big, some small, and some in-between. When brewing this hodge-podge of coffee mayhem, some granules are over extracted, some under, and again some in-between. The result is, again, anything but a proper cup of coffee.

Thus, the grinder is as important, if not more important, than the espresso machine. In the context of grinding, all coffee and all users are not created equal. Compared to a dark roast, a lighter roast, very common in the specialty coffee industry these days, requires significantly more torque to grind. Grinders can easily require double the torque to grind, if not greater, for lighter roasts. Such required torque can often render the grinder too hard to use, even for stronger users particularly when the grinder is a conventional hand coffee grinder and one using conical hand burrs.

Accordingly, a conical burr hand grinder solving these and other problems is desired.

A general non-limiting overview of practicing the present disclosure is presented below. The overview outlines exemplary practice of embodiments of the present disclosure, providing a constructive basis for variant and/or alternative and/or divergent embodiments, some of which are subsequently described.

Figure 1:
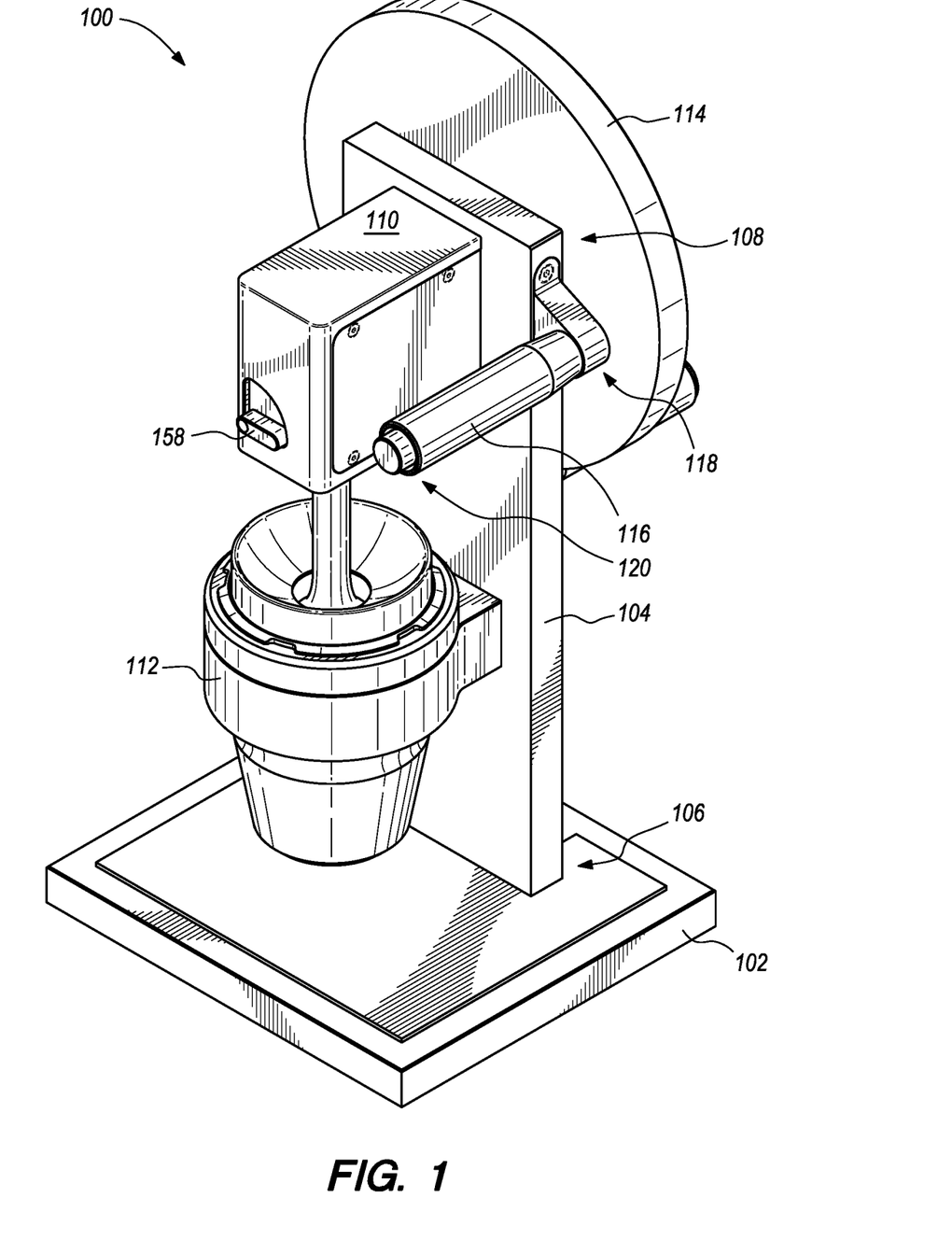
FIG. 1 is a perspective view of an exemplary embodiment disclosed herein.
Figure 2:
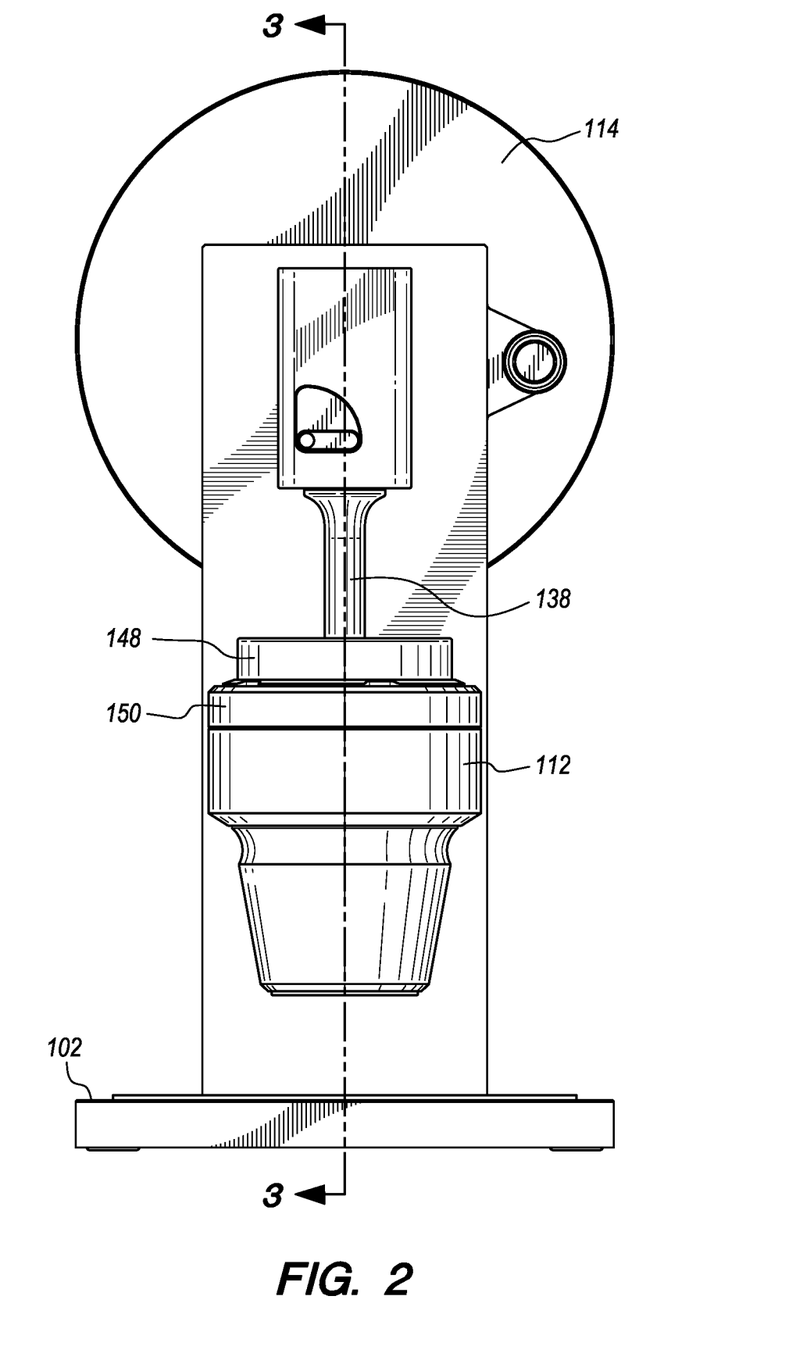
FIG. 2 is a front view of the device seen in FIG. 1.
Figure 3:
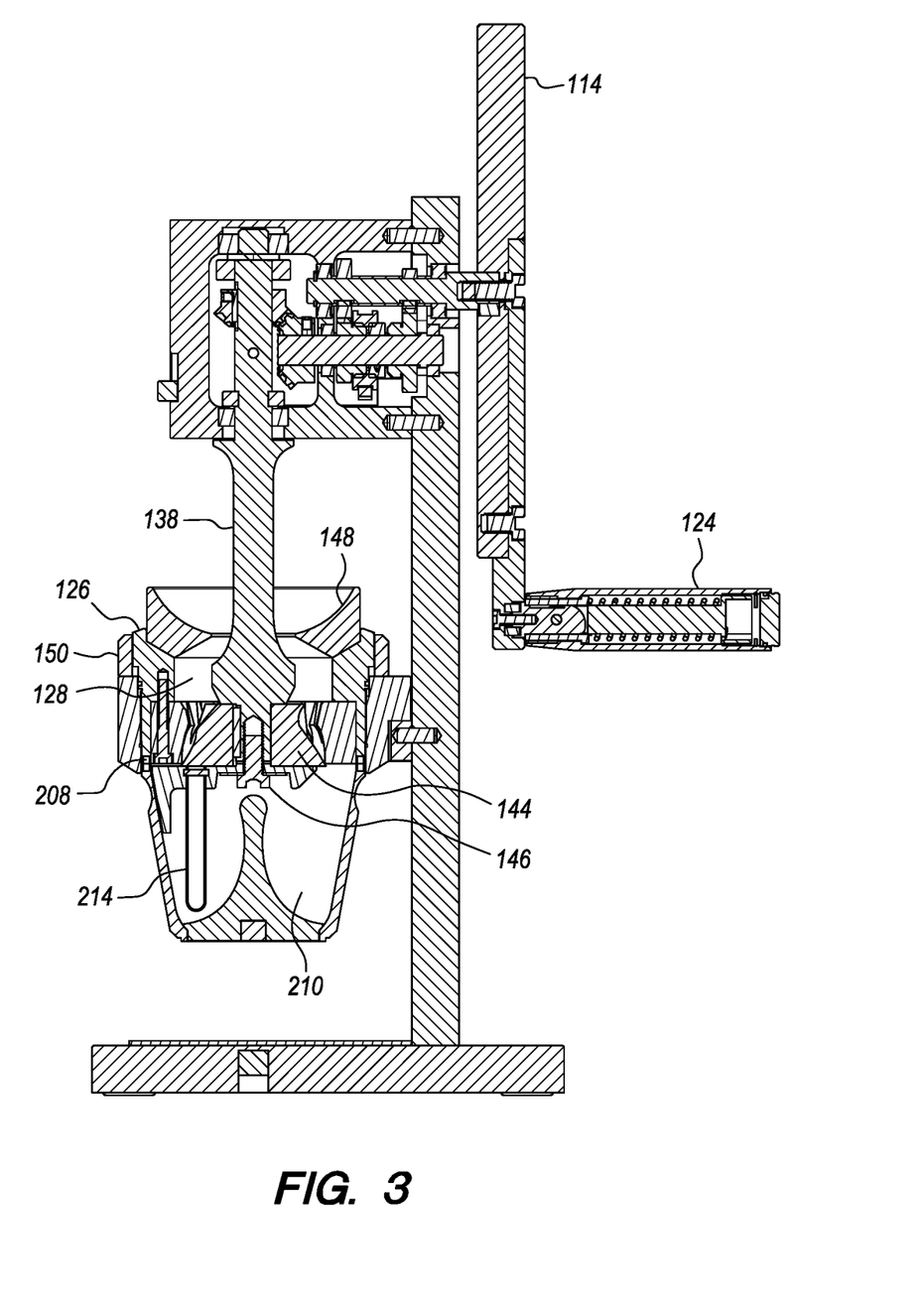
FIG. 3 is a cross-sectional view of the device seen in FIG. 1 taken alone line 3-3 seen in FIG. 2.

FIGS. 1-5 illustrate an exemplary embodiment of novel grinding device 100 disclosed herein. As seen in FIG. 1, the device 100 comprises a base 102 and a stanchion 104 having a top end 108 and an opposing bottom end 106. The bottom end 106 extends upward from base 102 in a generally orthogonal manner thereto. A gear box 110 is supported by the stanchion 104 and extends generally away from the top end 108 in a manner generally parallel to and above the base 102. A burr collar 112 is also supported by the stanchion 104 and extends generally away therefrom about mid-point between the top and bottom ends 108, 106. A flywheel 114 is supported by the stanchion 104 about its top end 108 generally opposite the gear box 110. A fixed handle 116 is disposed about the top end 108 of stanchion 104. The fixed handle 116 has a first end 118 and an opposing second end 120. The first end 118 is coupled to the stanchion 104. The fixed handle 116 has a receptacle cut therewithin to receive a brush having a brush handle 122 extending out of the receptacle about the second end 120. A foldable handle 124 is coupled to flywheel 114 to permit a user to rotate the flywheel 114 during operation of device 100. A burr mount 126 is supported by the burr collar 112. The burr mount 126 is generally cylindrical in shape wherein a grinding chamber 128 is centrally located therein.

The device 100 includes a gear mechanism 130 preferably having an intersecting gear configuration comprising a main driving gear 132 coupled to a main driving shaft 134, and a main driven gear 136 in mating engagement with the main driving gear 132. This gear 132 is in turn coupled to a main driven shaft 138. The main driving shaft 134 and main driven shaft 138 are on intersecting axes within the same plane. The main driven shaft 138 extends generally downward from the gear box 110. The main driving shaft 134 may be coupled directly to the flywheel 114 to provide a non-variable transmission. Optionally, the device 100 may include a variable transmission mechanism 152, as seen in FIGS. 1-5 and as discussed in more detail below wherein the main driving shaft 134 is indirectly coupled to the flywheel 114.

Regardless of whether the device 100 employs a gear mechanism 130 directly coupled to the flywheel 114 or indirectly coupled thereto via the optional variable transmission mechanism 152, the purpose of the gear mechanism 130 is to rotate the main driven shaft 138 during the grinding process. In particular, the device 100 includes a burr mechanism 140 for the actual grinding of coffee beans. The burr mechanism 140 includes an outer first set of burrs 142 fixed to the burr mount 126, and an inner set of burrs 144 rotatably coupled to one end of the main driven shaft 138 via burr attachment member 146. Each set 142, 144 is comprised preferably of 83 mm conical burrs. A funnel 148 is preferably disposed about the top of the burr mount 126. The funnel 148 aids in receipt of coffee beans to be ground by the device 100. A pitch grain adjuster 150 is optionally disposed about the burr mount 126 for adjusting the coarseness and/or fineness of the ground coffee.

Figure 4:
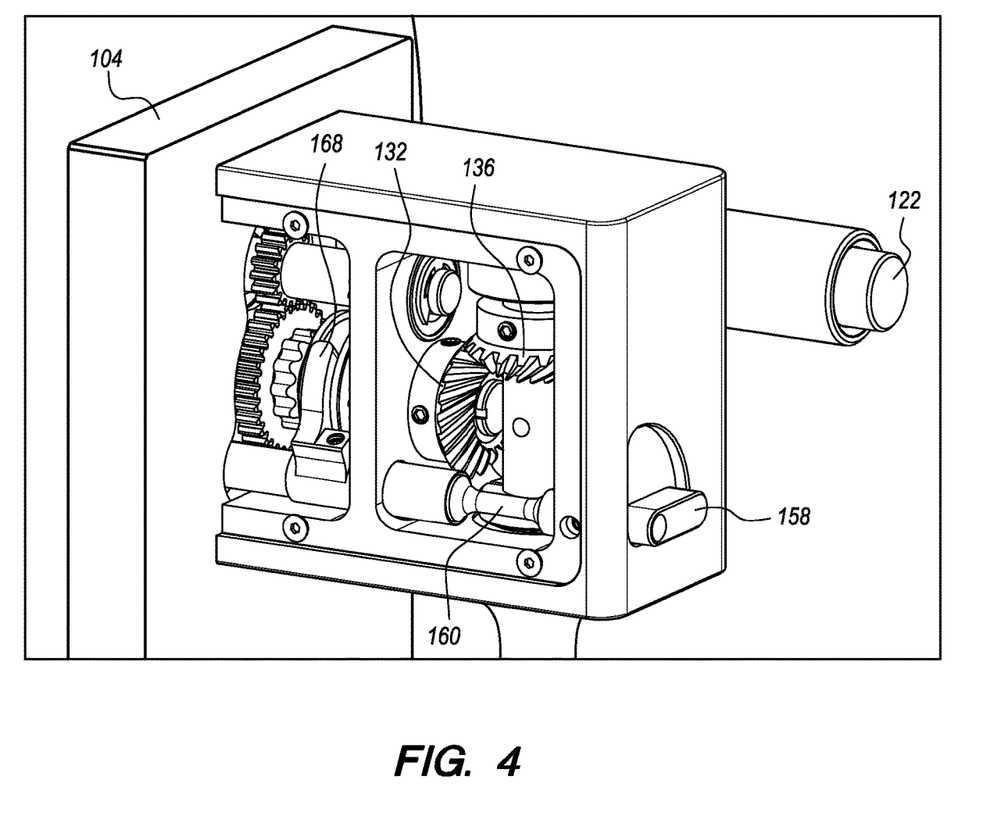
FIG. 4 is a perspective view of certain aspects of the embodiment shown in FIG. 1.
Figure 4A:
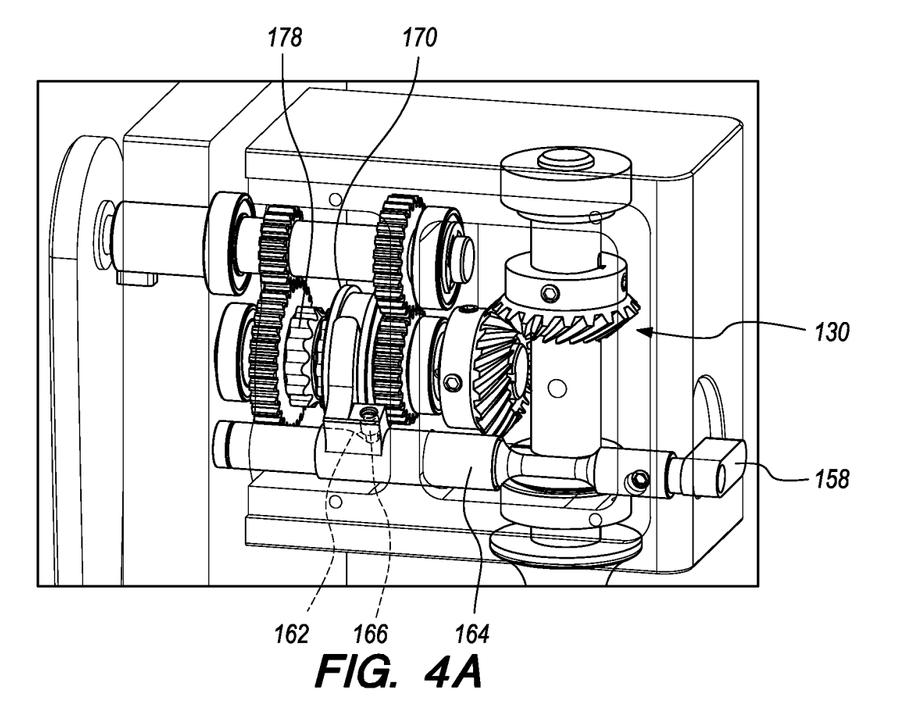
FIG. 4A is a detailed view of aspects seen in FIG. 4 wherein the gear selection lever has the optionable variable transmission of the device set in the 1:1 gear set.
Figure 4B:
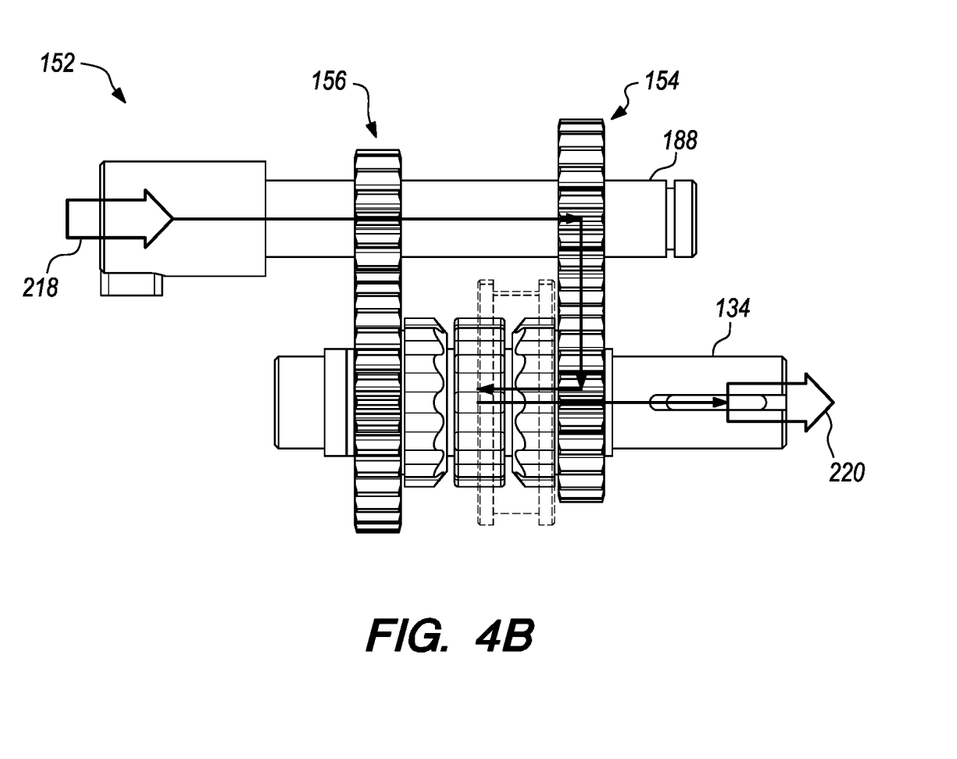
FIG. 4B is a schematic representation of the torque input and output of the device as seen in FIG. 4A.
Figure 4C:
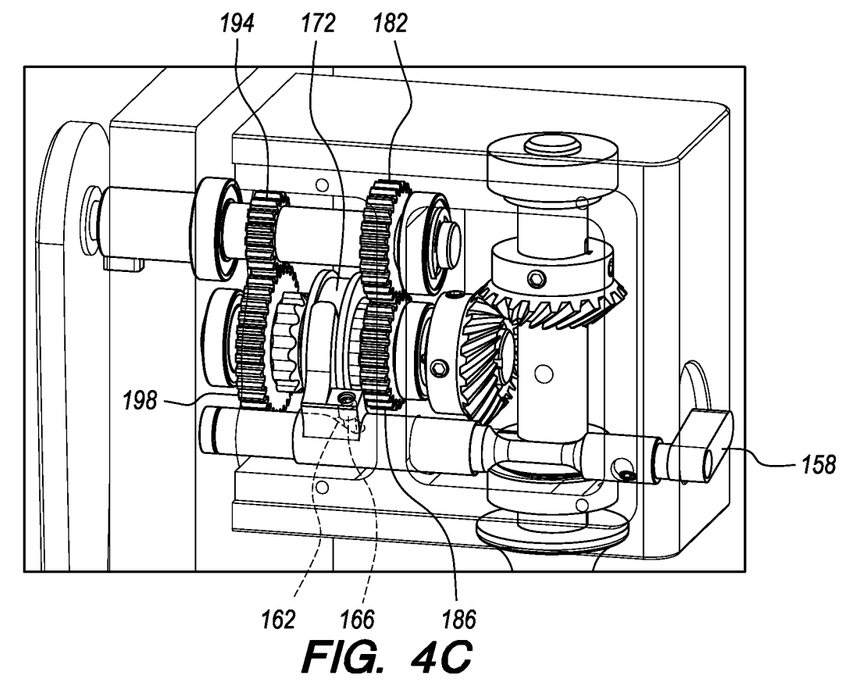
FIG. 4C illustrates a snapshot of the variable transmission of the device as it is being transitioned from the 1:1 gear set to the 1:2 gear set and particularly where the gear selection lever has been rotated 30° from the 0° position as seen in FIG. 4A.
Figure 4D:
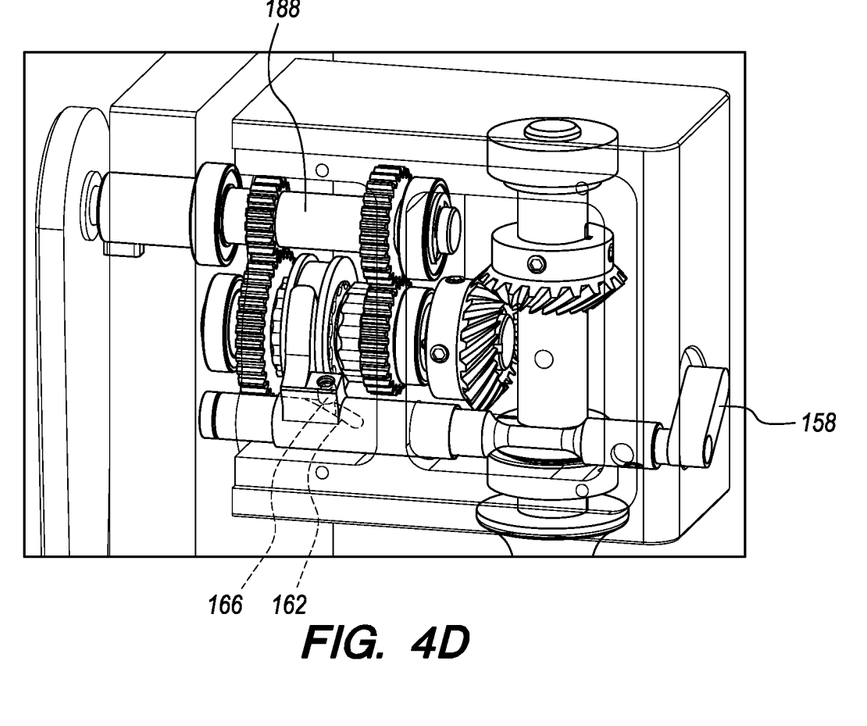
FIG. 4D illustrates a snapshot of the variable transmission of the device as it is being further transitioned from the 1:1 gear set to the 1:2 gear set and particularly where the gear selection lever has been rotated 60° from the 30° as seen in FIG. 4C.
Figure 4E:
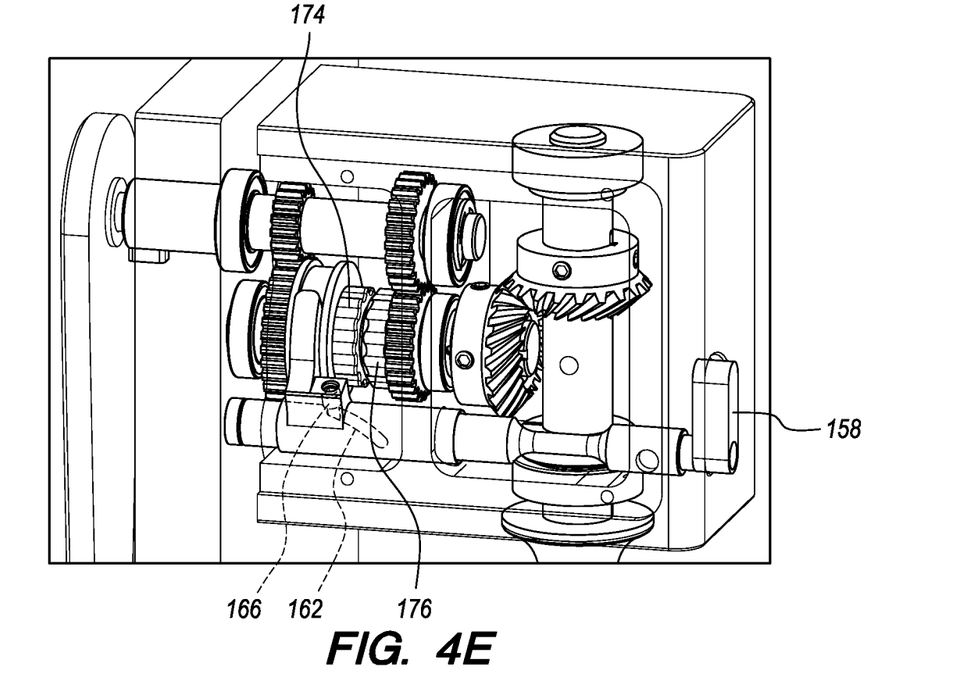
FIG. 4E illustrates the variable transmission of the device fully transitioned from the 1:1 gear set to the 1:2 gear set.
Figure 4F:
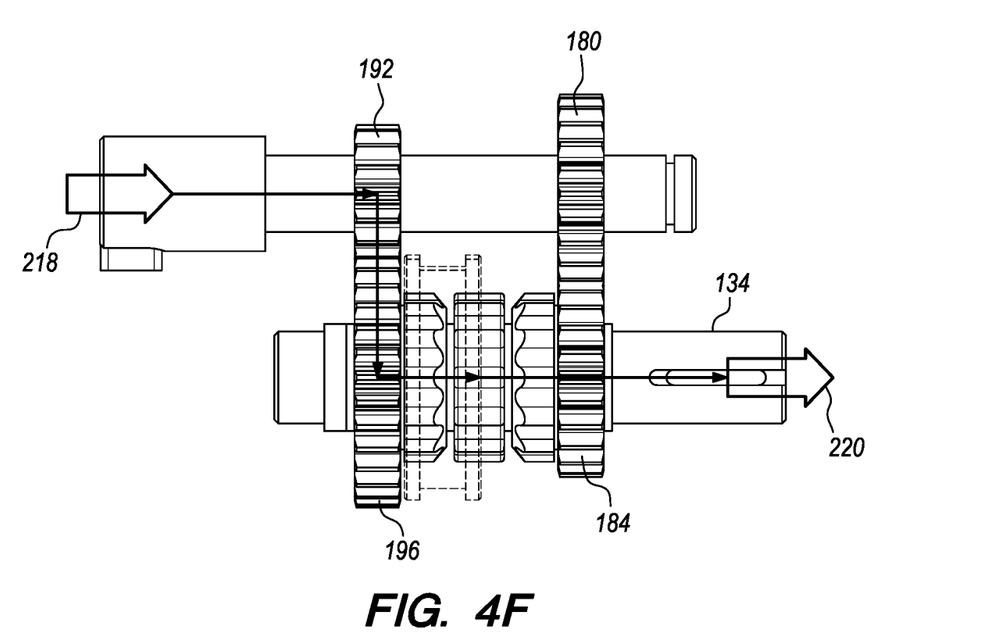
FIG. 4F is a schematic representation of the torque input and output of the device as seen in FIG. 4E.

As best seen in FIGS. 4-4F, the variable transmission mechanism 152 comprises a 1:1 gear set 154 and a 1:2 gear set 156. Each gear set 154, 156 is preferably of a parallel configuration involving gears connected to rotating shafts on parallel axes within the same plane. In other words, the rotation of the driving shaft (and the driving gear) is in the opposite direction to that of the driven shaft (and driven gear), wherein the efficiency of power is typically high. A gear selection lever 158 disposed about the gear box 110 permits the user to choose the 1:1 gear set 154 or the 1:2 gear set 156.

It is believed that in the history of hand coffee grinders, there has never been a coffee grinder with an adjustable gear ratio. The difference in required torques to grind between a 1:1 gear ratio and a 1:2 gear ratio works out according to the math. Now with novel device 100, a user may move the gear selection lever 158 to engage the 1:2 gear set 156. Doing so means the user need only employ half the power to turn the flywheel 114 for twice the number of revolutions. Thus, device 100 takes into consideration the variability of the bean hardness and the grind type (espresso, a finer grind, is inherently harder to grind than a coarse French press grind as more work is being done per revolution). So depending on the bean and grind type, the amount of torque required varies, wherein some users may not be able to use with ease the 1:1 gear set 154 to grind, for example, a medium-dark roast. However, novel device 100 with its 1:2 gear set 156 now makes such an experience pleasurable for all.

Turning to FIG. 4, gear selection lever 158 may be seen coupled to gear change axle 160 having a gear change channel 162 cut therewithin. A gear shuttle sleeve 164, with a hole cut therewithin, is disposed axially about the axle 160. A shuttle detent 166 is contained within the hole of sleeve 164. The shuttle detent 166 is configured to fit within gear change channel 162. A gear shuttle finger 168 extends away from the gear change axle 160. The gear shuttle finger 168 is configured to engage a gear coupler 170 with a coupler channel 172 cut therewithin. The coupler channel 172 receives the gear shuttle finger 168. The gear coupler 170 is disposed about a drive actuator 174. The rotation of the gear selection lever 158 causes the shuttle detent 166 to move axially along the path of the gear change channel 162, which in turn causes the shuttle finger 168 to slide axially from a position furthest away from stanchion 104, as seen in FIG. 4 in the 1:1 gear ratio, to a position closest to the stanchion 104, as seen in FIG. 4E in the 1:2 gear ratio. Doing so in turn causes the gear coupler 170 to disassociate from the 1:1 gear set 154 to the 1:2 gear set.

In particular, the 1:1 gear set 154 includes a 1:1 driving gear 180 with teeth 182, and a 1:1 driven gear 184 with teeth

186. Device 100 preferably comprises 8 total teeth 182 for the 1:1 driving gear 180. The 1:2 gear set 156 includes a 1:2 driving gear 192 with teeth 194, and a 1:2 driven gear 196 with teeth 198. Device 100 preferably comprises 16 total teeth 194 for the 1:2 driving gear 192. The 1:1 driving gear 180 and the 1:2 driving gear 192 are each coupled to a transmission driving shaft 188 for driving main driving shaft 134 that in turn drives main driven shaft 138.

FIG. 4B schematically illustrates the torque input 218 and the torque output 220 when the device is in the 1:1 gear set 154. As seen in FIG. 4B, rotation of flywheel 114 causes torque input 218 on transmission driving shaft 188. Since the 1:1 gear set 154 is employed, the gear coupler 170 is disposed about the drive actuator 174 and the 1:1 coupling gear 176. Doing so transmits the torque input 218 through transmission driving shaft 188, through 1:1 driving gear 180, through 1:1 driven gear 184, and through main driving shaft 134 with its torque output 220.

FIG. 4F schematically illustrates the torque input 218 and the torque output 220 when the device is in the 1:2 gear set 156. As seen in FIG. 4F, rotation of flywheel 114 causes torque input 218 on transmission driving shaft 188. Since the 1:2 gear set 156 is employed, the gear coupler 170 is disposed about the drive actuator 174 and the 1:2 coupling gear 178. Doing so transmits the torque input 218 through transmission driving shaft 188, through 1:2 driving gear 192, through 1:2 driven gear 196, and through main driving shaft 134 with its torque output 220.

Figure 5:
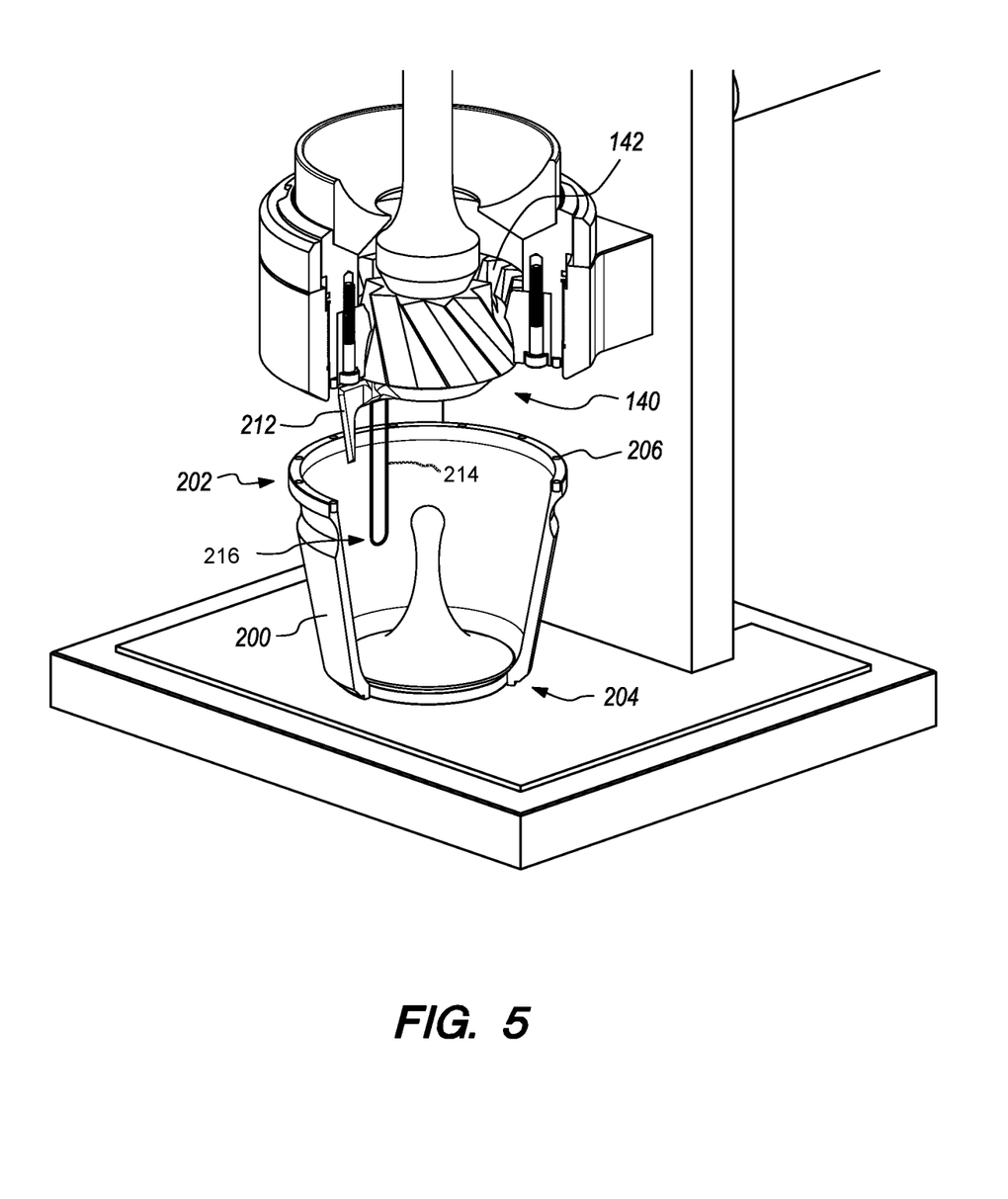
FIG. 5 is a perspective view of certain aspects of the embodiment shown in FIG. 1 with the tumbler detached.

Turning to FIG. 5, one can see the device 100 also includes a detachable tumbler 200 (compare how tumbler 200 is attached in FIG. 1 versus detached in FIG. 5). Tumbler 200 has a top 202 and an opposing bottom 204 with a ground chamber 210 in its interior. Tumbler 200 is detachable preferably via an array of strong magnets 206 about its top. A corresponding array of magnets 208 are disposed about the burr mount 126 at its bottom.

The device 100 optionally includes a wiper 212 extending downward from the burr collar 112. The wiper 212 is configured to slide about the interior wall of tumbler 200 when it is attached to the device 100 and it is in operation.

The device 100 also optionally includes a distribution member 214 extending downward from the burr collar 112 in communication with the main driven shaft 138. The distribution member 214 has a top and an opposing bottom 216. The distribution member 214 is configured to have a length such that the bottom 216 of member 214 is near the bottom 204 of tumbler 200 but not scraping the sides so as to avoid bad noises. The distribution member 214 is preferably a single stainless steel rod but may be a series of rods or the like. Regardless of the exact structure, the integrated distribution member 214 is an evolution of coffee preparation in that member 214 eliminates the extra step of stirring or shaking to have a homogenized puck of coffee grounds. With novel device 100, as the main driven shaft 138 rotates to grind coffee via burr mechanism 140, the distribution member 214 also rotates within ground chamber 210. Thus, while grinding, the exited grounds are automatically stirred up with the distribution member 214, so that by the time the user finishes grinding, everything has been evenly stirred and prepared, eliminating the need for another homogenizing step.

The device 100 is of the highest build quality. In particular, it is preferred that the base 102, stanchion 104, and other frame components be constructed of 20 mm thick 6061 T6 aluminum plates that are sandblasted and anodized to provide a tough outer shell. The gears in gear mechanism 130 and the 1:1 gear set 154 and 1:2 gear set 156 are preferably hardened spiral mitered steel gears on stainless steel shafts that connect the flywheel 114, which preferably has a 15 mm diameter, to the conical grinding burr mechanism 140. The burr mechanism 140 is preferably milled via computer numerical control to ensure precise alignment of the grinding elements.

In operation of device 100, a user pours the desired type and amount of coffee beans into funnel 148. If the tumbler 200 is not attached to the device 100, the user simply brings the tumbler 200 toward the burr collar 112 to permit the associated magnets 206, 208 to attract and couple the tumbler 200 to the device 100. Next, with the optional variable transmission mechanism 152 installed in device 100, the user chooses whether to use the 1:1 gear set 154 or the 1:2 gear set 156, and rotates the gear selection lever 158 as needed. The user then grabs foldable handle 124 and rotates it downward if it was in its upright stored position. Next, the user turns foldable handle 124 to rotate flywheel 114. If need be, the user may grab fixed handle 116 for additional leverage or convenience. Rotation of flywheel 114 causes main driven shaft 138 to rotate, which in turn causes inner burrs 144 to rotate and crush coffee beans between inner burrs 144 and outer burrs 142. Since the exit point of the ground coffee is directly into the ground chamber 210 of tumbler 200, i.e., there are no chutes, dosing mechanisms, or nooks and crannies for ground to become trapped, if the user measures 17.0 grams of coffee beans for the shot and puts same into the device 100, the user gets as close to 17.0 grams as possible of ground coffee coming out. Moreover, with the optional wiper 212 and distribution member 214 installed, the user need not worry about grounds being retained on the interior side walls of tumbler 200 or fear there will be an improperly homogenized puck.

One skilled in the art should now be able to glean quickly that the particular structure of the disclosed device 100 permits any user to grind coffee beans with ease. The resulting grounds offer a balanced blend of coarse and fine sized granules ideal for espresso. Moreover, by the time the user has finished grinding, the grounds have been evenly stirred and prepared, eliminating the need for a homogenizing step.

While certain embodiments have been described, the embodiments have been presented by way of example only and are not intended to limit the scope of the inventions. Indeed, the novel grinding device described herein may be embodied in a variety of other forms. Furthermore, various omissions, substitutions, and changes in the form of the disclosed elements may be made without departing from the spirit of the inventions. The accompanying claims and their equivalents are intended to cover such forms or modifications as would fall within the scope and spirit of the inventions.

The invention claimed is:

1. A grinding device for grinding coffee beans comprising:
   a base;
   a stanchion having a top end and an opposing bottom end, wherein the bottom end of the stanchion is disposed about the base;
   a gear box extending away from the stanchion;
   a burr collar extending away from the stanchion;
   a flywheel extending away from the stanchion, wherein the flywheel includes a handle for turning the flywheel;
   a gear mechanism including a main driving gear, a main driving shaft, a main driven gear, and a main driven shaft, wherein the main driven shaft extends downward from the gear box, wherein the flywheel is coupled to the main driven shaft;

a burr mechanism including a first set of burrs and a second set of burrs, the first set of burrs rotatably coupled to the main driven shaft; and a variable transmission mechanism for varying an amount of torque required to grind the coffee beans depending on a coffee bean hardness and coffee grind type, wherein the variable transmission mechanism has a first gear set and a second gear set, wherein the first gear set and the second gear set are selectively engageable to drive the gear mechanism.

2. The grinding device of claim 1, wherein the first gear set is a 1:1 gear set.

3. The grinding device of claim 1, wherein the second gear set is a 1:2 gear set.

4. The grinding device of claim 1, wherein the first gear set includes a 1:1 driving gear with a first set of teeth, and a 1:1 driven gear with a second set of teeth.

5. The grinding device of claim 4, wherein the second gear set includes a 1:2 driving gear with a third set of teeth, and a 1:2 driven gear with a fourth set of teeth.

6. The grinding device of claim 5, wherein the 1:1 driving gear includes 16 teeth.

7. The grinding device of claim 1, further comprising a gear selection lever disposed about the gear box, wherein the first gear set and the second gear set are selectively engageable by rotation of the gear selection lever.

8. The grinding device of claim 7, wherein the gear selection lever is coupled to a gear change axle having a gear change channel, and further comprising a gear shuttle sleeve slideably disposed about the gear change axle, wherein the gear shuttle sleeve as a hole.

9. The grinding device of claim 8, further comprising a shuttle detent configured to fit within the hole of the gear shuttle sleeve.

10. The grinding device of claim 9, further comprising a gear shuttle finger extending away from the gear shuttle sleeve, wherein rotation of the gear selection lever causes the shuttle detent to slide axially within the gear change channel.

11. The grinding device of claim 10, further comprising a gear coupler disposed about the main driving shaft, wherein the gear coupler includes a coupler channel configured to receive the shuttle finger, wherein rotation of the gear selection lever causes the gear coupler to slide axially along the main driving shaft.

12. The grinding device of claim 11, further comprising a 1:1 coupling gear disposed about the main driving shaft, and a 1:2 coupling gear disposed about the main driving shaft, wherein rotation of the gear selection lever causes the gear coupler to slide axially along the main driving shaft and engage the 1:1 coupling gear or the 1:2 coupling gear.

13. The grinding device of claim 1, further comprising a tumbler having a top, an opposing bottom, and a ground chamber, wherein a first set of magnets is disposed about the top of the tumbler.

14. The grinding device of claim 13, further comprising a burr mount supported by the burr collar, wherein a second set of magnets is disposed about the burr mount for attracting the first set of magnets of the tumbler.

15. The grinding device of claim 13, further comprising a wiper supported by the burr collar, wherein the wiper is configured to slide about the tumbler in the ground chamber during operation of the device.

16. The grinding device of claim 13, further comprising a distribution member supported by the burr collar, wherein the distribution member is configured to rotate within the ground chamber of the tumbler during operation of the device.

17. A grinding device comprising:
a base;
a stanchion having a top end and an opposing bottom end, wherein the bottom end of the stanchion is disposed about the base;
a main driven shaft supported by the stanchion;
a burr mechanism supported by the stanchion and including a first set of burrs and a second set of burrs, the first set of burrs rotatably coupled to the main driven shaft;
a tumbler having a top, an opposing bottom, and a ground chamber, wherein the tumbler is supported by the stanchion;
a distribution member for homogenizing coffee grounds contained within the ground chamber of the tumbler, wherein the distribution member has a top and an opposing bottom, wherein the top of the distribution member is supported by the stanchion directly under the main driven shaft, and wherein the distribution member is configured to have a length such that the bottom of the distribution member is disposed near the bottom of the tumbler to rotate within the ground chamber during operation of the device;
a burr mount supported by the stanchion; and
a wiper supported by the burr mount, wherein the wiper is configured to slide about the tumbler in the ground chamber during operation of the device.

18. The grinding device of claim 17, wherein the distribution member is a stainless steel rod.

19. The grinding device of claim 17, wherein a first set of magnets is disposed about the top of the tumbler, and wherein a second set of magnets is disposed about the burr mount for attracting the first set of magnets of the tumbler.

* * * * *